United States Patent [19]

Kato et al.

[11] Patent Number: 5,135,239

[45] Date of Patent: Aug. 4, 1992

[54] SEAL MEMBER FOR OUTBOARD COWLING

[75] Inventors: Naoki Kato; Michihiro Tagushi, both of Hamamatsu, Japan

[73] Assignee: Sanshin Kogyo Kabushiki Kaisha, Hamamatsu, Japan

[21] Appl. No.: 704,902

[22] Filed: May 21, 1991

Related U.S. Application Data

[63] Continuation of Ser. No. 427,755, Oct. 26, 1989, abandoned.

[30] Foreign Application Priority Data

Oct. 27, 1988 [JP] Japan .................................. 63-271773
Feb. 23, 1989 [JP] Japan ..................................... 1-43989

[51] Int. Cl.⁵ ........................ F16J 15/10; B63H 21/00
[52] U.S. Cl. ........................ 277/186; 49/488; 49/490; 49/497; 277/226; 440/76; 440/77; 440/900
[58] Field of Search ................. 49/488, 489, 490, 496, 49/497, 499; 123/195 R, 195 C, 195 P; 277/178, 181, 182, 183, 184, 186, 226; 440/76, 77, 78, 900

[56] References Cited

U.S. PATENT DOCUMENTS

| | | | |
|---|---|---|---|
| 2,910,209 | 10/1959 | Nelson | 277/226 X |
| 3,179,987 | 4/1965 | Banzet | 49/489 X |
| 3,374,580 | 3/1968 | Ruff | 49/488 X |
| 4,095,640 | 6/1978 | Beckerer, Jr. | 49/489 X |
| 4,474,402 | 10/1984 | Shelton | 49/498 X |
| 4,599,825 | 7/1986 | Sixsmith | 49/488 X |
| 4,613,310 | 9/1986 | Suzuki et al. | 440/77 X |
| 4,617,220 | 10/1986 | Ginster | 49/490 X |
| 4,667,966 | 5/1987 | Oehrle et al. | 277/226 X |
| 4,698,037 | 10/1987 | Wantanabe et al. | 440/78 |
| 4,734,070 | 3/1988 | Mondek | 440/77 X |
| 4,744,572 | 5/1988 | Sahba et al. | 277/226 X |
| 4,769,950 | 9/1988 | Ogawa et al. | 49/497 X |
| 4,819,382 | 4/1989 | Suzuki et al. | 49/497 |
| 4,930,790 | 6/1990 | Sheridan | 440/77 X |

FOREIGN PATENT DOCUMENTS

| | | | |
|---|---|---|---|
| 119593 | 9/1980 | Japan | 440/77 |
| 26092 | 2/1982 | Japan | 440/77 |
| 161692 | 9/1983 | Japan | 440/77 |
| 156895 | 9/1984 | Japan | 440/77 |
| 60098 | 4/1985 | Japan | 440/76 |
| 222894 | 10/1986 | Japan | 440/77 |
| 282195 | 12/1986 | Japan | 440/77 |
| 155196 | 7/1987 | Japan | 440/77 |

Primary Examiner—William A. Cuchlinski, Jr.
Assistant Examiner—Scott W. Cummings
Attorney, Agent, or Firm—Ernest A. Beutler

[57] ABSTRACT

A number of embodiments of seal arrangement for sealing between the cowling and tray of the powerhead of an outboard motor. In each embodiment, the seal includes a base portion, a seal portion and an intermediate portion that deflects by bending for achieving sealing action without necessitating any compression of the material in the seal. As a result, significantly lower sealing pressures can be employed.

3 Claims, 5 Drawing Sheets

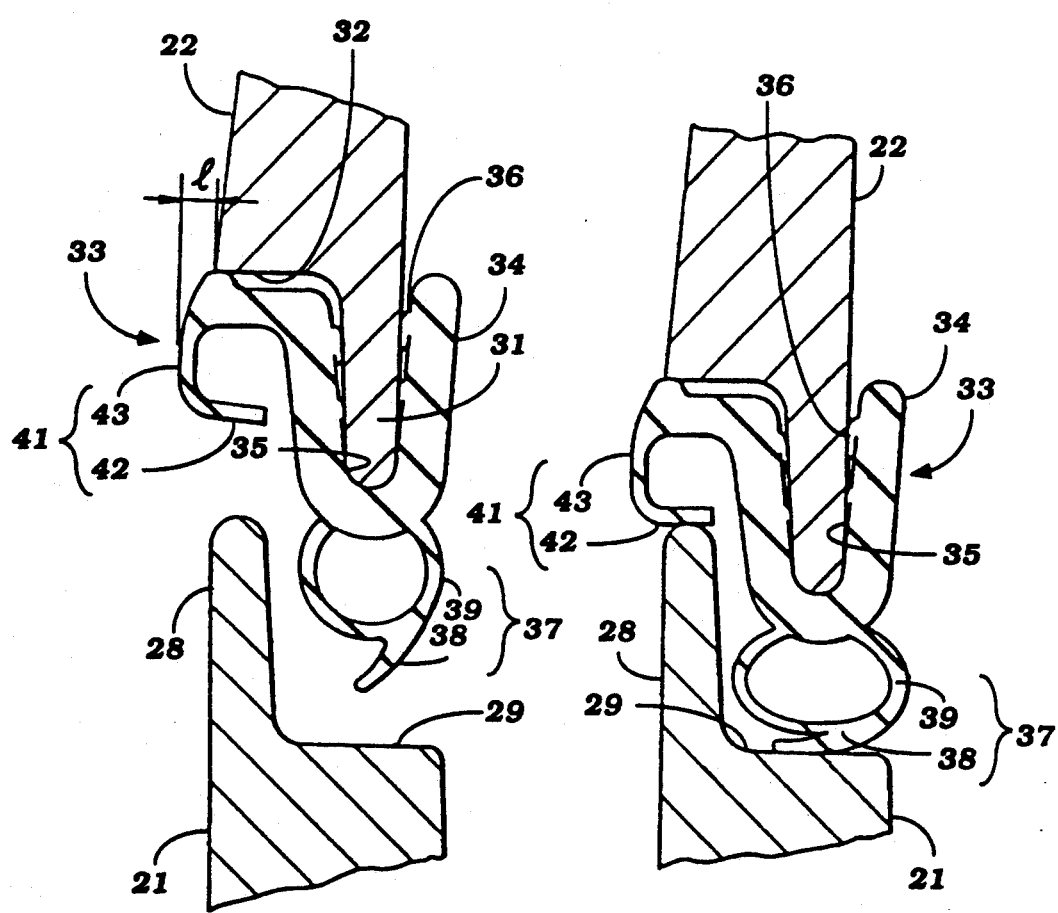

SEAL MEMBER FOR OUTBOARD COWLING

This is a continuation of U.S. patent application Ser. No. 427,755, filed Oct. 26, 1989, now abandoned.

BACKGROUND OF THE INVENTION

This invention relates to a seal member for an outboard cowling and more particularly to an improved seal arrangement for sealing between the tray and main cover portion of the outer cowling of an outboard motor.

It is the common practice in outboard motors to conceal the internal combustion engine of the powerhead within a protective outer cowling. This outer cowling normally includes a tray portion which extends beneath the engine and is affixed to the upper end of the drive shaft housing and a main cover portion that is detachably connected to the tray portion. It is, of course, desirable to provide an effective seal between the tray and main cowling portions so as to prevent the intrusion of foreign material into the protective cowling. Also, the main cowling portions should be readily removable for access to the engine for servicing and other purposes.

Conventionally it has been the practice to employ a compression type seal that is normally carried by the main cowling portion and which engages the tray for sealing. However, with such compression seals it is necessary to provide quite high sealing forces. For example, if the peripheral length of the seal is in the range of 2,000 millimeters, it is frequently necessary to apply a pressing force in the range of 100 to 200 kilograms to the seal member in assembling the cowling so as to insure good sealing. Such high compressive forces can cause distortion of the outer cowling which is obviously not desirable. In addition, in order to provide the necessary sealing force the latching mechanism must be constructed in such a way so as to generate a force amplification. This obviously gives rise to large and unsightly latch mechanisms.

It is, therefore, a principal object of this invention to provide an improved sealing arrangement for sealing between the tray and outer cowling of an outboard motor.

It is a further object of this invention to provide an improved outboard motor cowling seal assembly wherein compressive forces are not required in order to achieve sealing.

It is a still further object of this invention to provide a bending rather than a compression type seal for the outer cowling of an outboard motor.

When the term "compression" is used herein in the specification and claims, this is intended to refer to a type of seal where the volume of the material is reduced under sealing to effect the seal.

SUMMARY OF THE INVENTION

This invention is adapted to be embodied in a seal arrangement for interposition between the tray and cowling of the powerhead of an outboard motor or the like for facilitating sealing without necessity of compressing the seal. The seal comprises a base portion for affixing the seal to one of the tray and the cowling. A seal portion is further provided for sealingly engagement with the other of the cowling and the tray when the cowling and tray are affixed to each other. An intermediate portion integrally connects the base portion with the seal portion and this intermediate portion is deflected by bending upon assembly of the cowling to the tray for sealing engagement of the seal portion without necessitating compression thereof.

BRIEF DESCRIPTION OF THE DRAWINGS

FIG. 2 is an enlarged cross sectional view showing a first embodiment of the seal prior to sealing engagement.

FIG. 3 is a cross sectional view, in part similar to FIG. 2, showing the seal after its sealing engagement.

DETAILED DESCRIPTION OF THE PREFERRED EMBODIMENTS OF THE INVENTION

Figure 1:
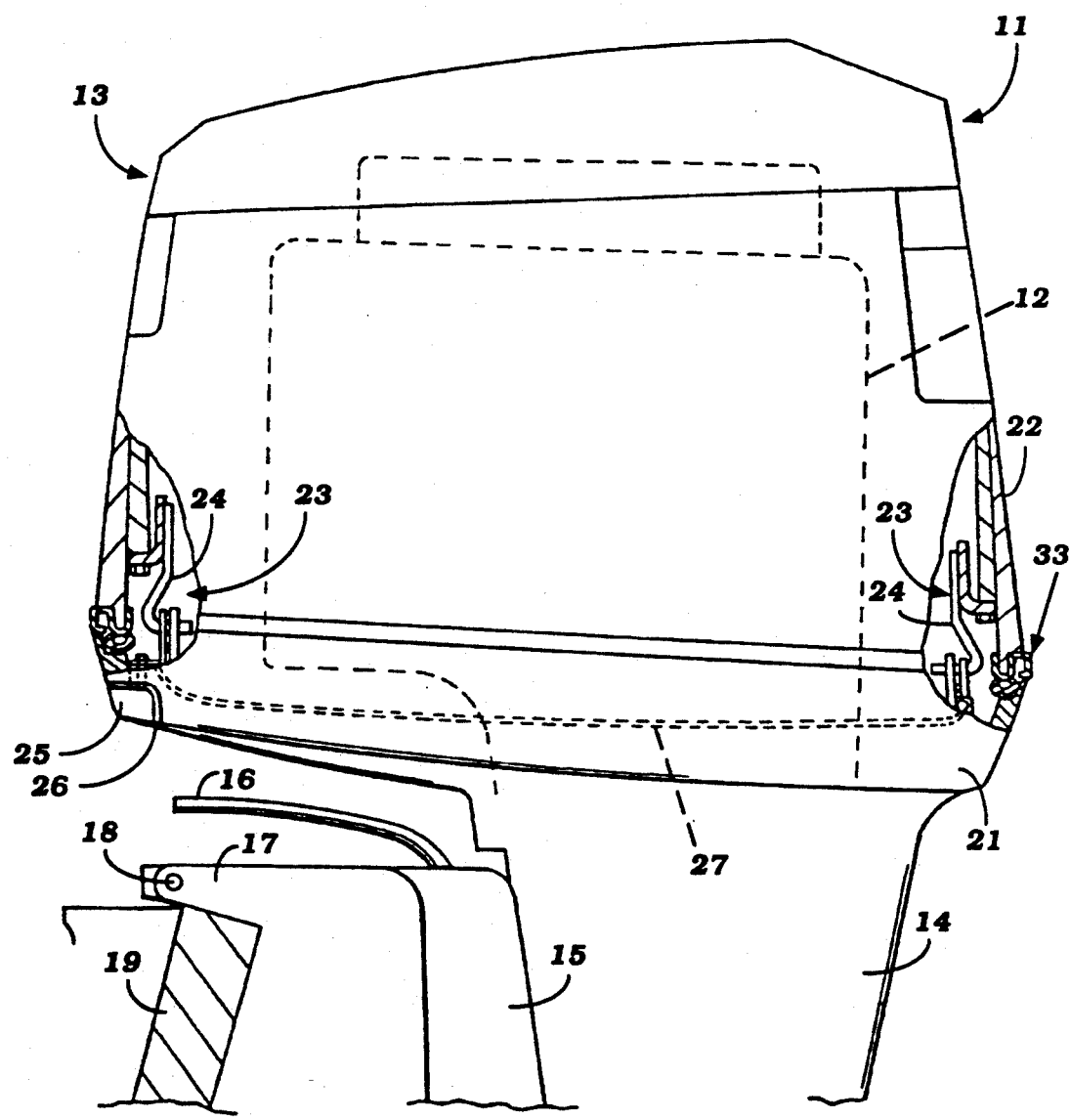
FIG. 1 is a partial side elevational view of an outboard motor attached to the transom of an associated watercraft, with portions broken away and other portions shown in section.

Referring first to FIG. 1, an outboard motor is identified generally by the reference numeral 11 and is depicted as a typical environment in which the invention may be utilized. The outboard motor 11 includes a power head that is comprised of a powering internal combustion engine, which may be of any known type and is identified generally by the reference numeral 12 and a surrounding protective cowling, indicated generally by the reference numeral 13 and incorporating a seal constructed in accordance with an embodiment of the invention. This construction will be described in more detail later.

The engine 12 drives a driveshaft (not shown) that depends through and is journaled within a driveshaft housing 14. This driveshaft terminates in a lower unit which is not shown and drives a propeller through a conventional forward, neutral, reverse transmission, as is well known in this art.

A steering shaft (not shown) is affixed in a known manner to the driveshaft housing 14 and is journaled within a swivel bracket 15 for steering of the outboard motor 11 about a generally vertically extending steering axis. A steering tiller or steering arm 16 is affixed to this steering shaft for this steering operation.

The swivel bracket 15 is connected to a clamping bracket 17 by means of a horizontally extending pivot pin 18 for tilt and trim movement of the outboard motor 11 in a known manner. The clamping bracket 17 carries a clamping device (not shown) for affixing the outboard motor 11 to a transom 19 of a watercraft in a known manner. As had been previously noted, the outboard motor 11 has been described only as being typical of the environment in which the invention may be utilized and, except for the sealing arrangement now to be described, the outboard motor 11 may be considered to be conventional. For that reason, the details of the construction and operation of the outboard motor 11 are not believed to be necessary to understand the invention.

Referring now in detail additionally to FIGS. 2 and 3, the protective cowling 13 includes a lower tray portion 21 and an upper or main cowling portion 22. The cover 22 and tray 21 are connected to each other by means of a releasable latching mechanism, indicated generally by the reference numeral 23 and which may be of the type generally described in the co-pending application entitled "Connecting Device For Outboard Cowling", Ser. No. 400,159, filed Aug. 28, 1989 in the name Eifu Watanabe and assigned to the assignee of this application. This latching mechanism 23 includes a pair of fixed keepers 24 that are affixed in a suitable manner to the main cowling portion 22 and which cooperate with a releasable latching mechanism that is operated by means of an operating handle 25 that is concealed within a recess 26 formed in the tray 21. There are provided latching mechanisms 23 at the front and rear ends of the outboard motor and these latching mechanisms are interconnected by means of a simultaneous operator 27. Since the latching mechanism per se forms no part of the invention, further description is not necessary and reference may be had to the aforenoted co-pending application for details of a specific latch mechanism that may be utilized in conjunction with the invention.

Referring now in detail to FIGS. 2 and 3, it will be seen that the peripheral edge of the tray 21 is formed with an upstanding portion 28 that extends around the outer periphery of the tray 21 adjacent a generally horizontally extending sealing surface 29. In a similar manner, the outer surface of the main cowling portion 22 is provided with a downwardly extending flange 31 that is positioned inwardly from a sealing surface 32. In accordance with the invention, a seal indicated generally by the reference numeral 33 is provided for sealing between these two areas. The seal 33 is designed so as to be affixed to one of the cover 22 or tray 21 and sealingly engage the other of these members. In the illustrated embodiment, as is typical, the seal 33 is carried by the main cowling portion 21 and sealingly engages the tray 21 and specifically its surfaces 28 and 29.

As will be seen, the seal 33 has a base portion 34 that defines a groove or recess 35 that receives and engages the main cowling portion projection or flange 31. To assist in sealing and retention, a plurality of ribs 36 are formed on opposite sides of the recess 35.

A first seal part, indicated generally by the reference numeral 37, cooperates with the sealing surface 29 of the tray 21 for sealing. This sealing part 37 includes a seal portion 38 that has a generally lip type configuration and which is connected to the base portion 34 by an intermediate tubular portion 39. As may be seen in FIGS. 2 and 3, when the main cowling portion 22 is connected to the tray 21, sealing engagement of the seal portion 38 with the sealing surface 29 is achieved not by compression by bending of the intermediate portion 38 and also some bending of the seal portion 38. As a result, compression of the material of the seal 33 is not required and a good seal can be achieved with substantially lower sealing forces.

The seal 33 further includes a second sealing part 41 that cooperates between the cowling surface 32 and the upper surface of the tray projection 28. This sealing part 41 includes a sealing portion 42 that also is a lip type seal and which is connected to the base part 34 by an intermediate portion 43. As may be seen in FIGS. 2 and 3, the seal portion 42 is brought into sealing engagement with the upper portion of the flange projection 28 upon assembly and the intermediate portion 43 will deflect by bending so as to assist sealing. There will also be some bending of the seal portion 42. It should be noted that the intermediate portion 43 is spaced outwardly from the outer surface of the main cowling portion 22 by a distance 1 so as to facilitate this bending operation without necessitating any compression of the seal.

Figure 4:
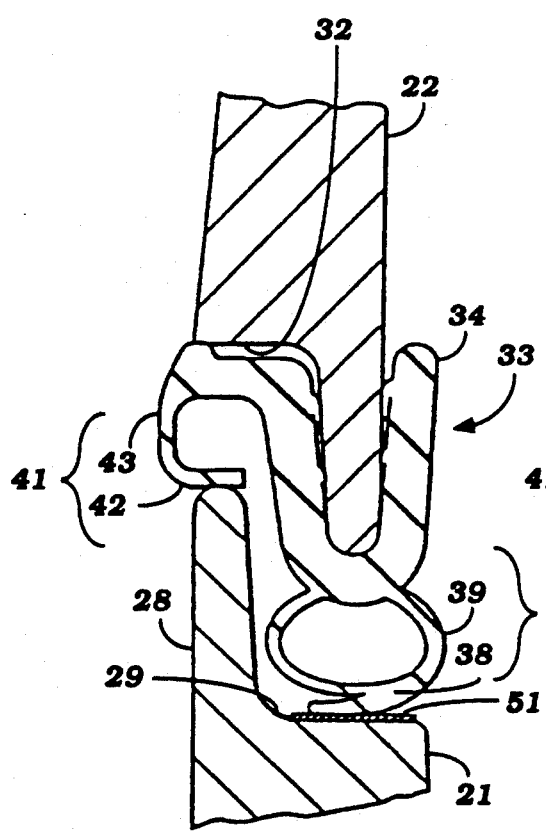
FIG. 4 is a cross sectional view, in part similar to FIGS. 3, showing another embodiment of the invention.

FIG. 4 shows another embodiment of the invention which is generally similar to the embodiment of FIGS. 2 and 3. In this embodiment, however, a teflon or other low friction wear strip 51 is affixed in a suitable manner to the tray sealing surface 29 for engagement with the seal portion 38. As a result, there will be low friction in this area and any abrasion, wear of the seal portion 38 will be avoided.

Figure 5:
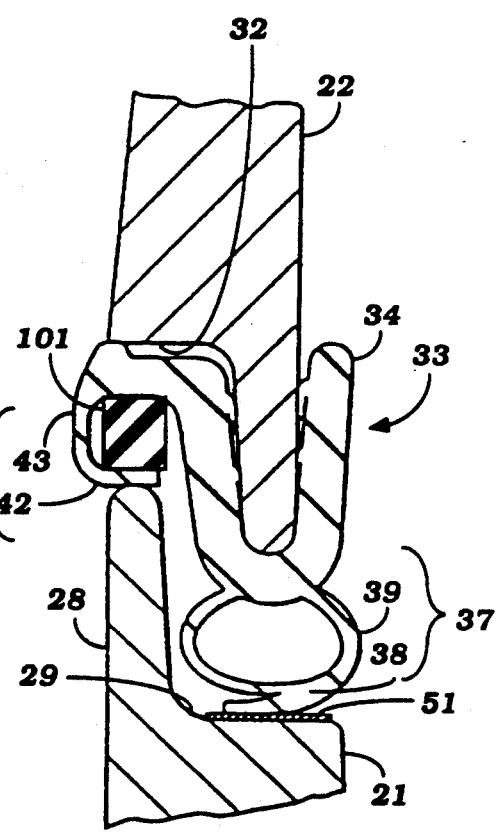
FIG. 5 is a cross sectional view, in part similar to FIGS. 3 and 4 and shows yet another embodiment of the invention.
Figure 6:
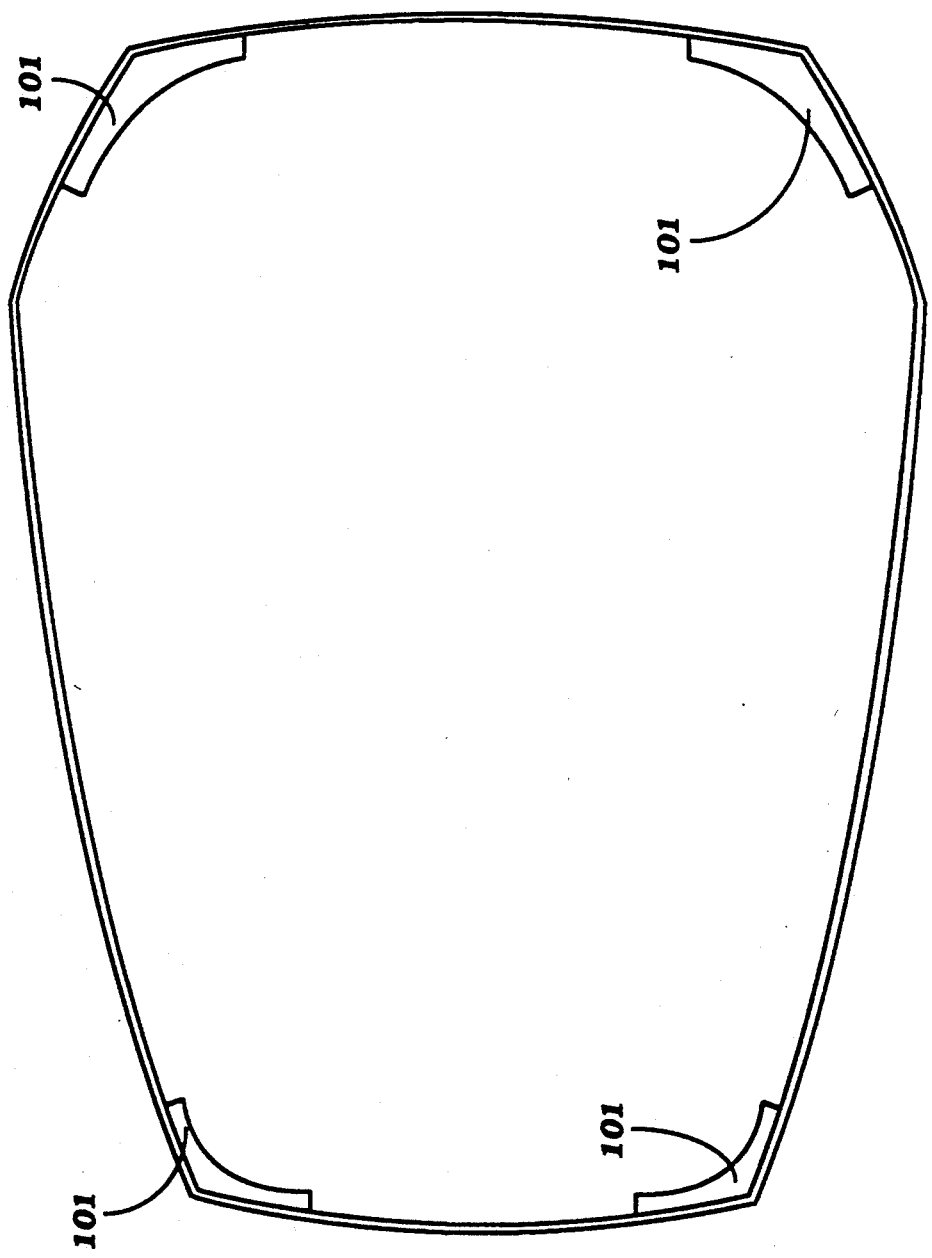
FIG. 6 is a top plan view, on a reduced scale, showing the construction of the embodiment of FIG. 5.

In the embodiments of the invention as thus far described, the seal 33 is designed so as to effect a good seal at very low sealing pressures due to the fact that the seal is achieved without any compression of the seal material. However, this also means that the holding forces can be quite small between the tray 21 and main cowling portion 22 and this coupled with the resilience with the seal 33 might give rise to some shake or vibration of the main cowling portion 22 relative to the tray 21. FIGS. 5 and 6 shown an embodiment wherein such shake can be avoided. The seal arrangement in this figure is substantially the same as that in FIG. 4 and, for that reason, components which are the same have been identified by the same reference numerals and will be described again only insofar as is necessary to understand the construction and operation of this embodiment.

In this embodiment, the seal part 41 is provided with a series of angularly spaced inner members 101 that are disposed at the four corners of the main cowling portion 22 as may be best seen in FIG. 6. These more rigid but nevertheless resilient members 101 are received between the seal part 44 and intermediate portion 43 of the seal parts 41 and because of their angular shape will give rigidity to the construction to reduce the possibility of shake as should be readily apparent.

Figure 7:
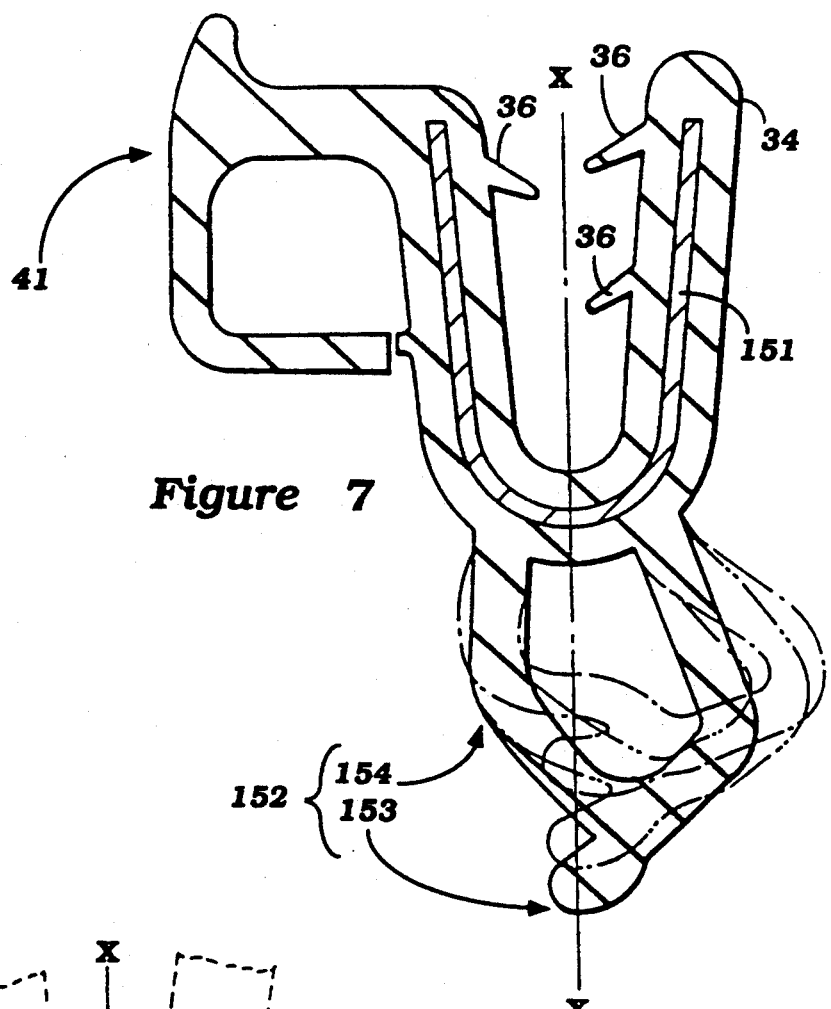
FIG. 7 is a cross sectional view, in part similar to FIGS. 3, 4, and 5 and shows another embodiment of seal. In this figure, the seal is shown in solid line view as it appears before assembly and in phantom line view after assembly.
Figure 8:
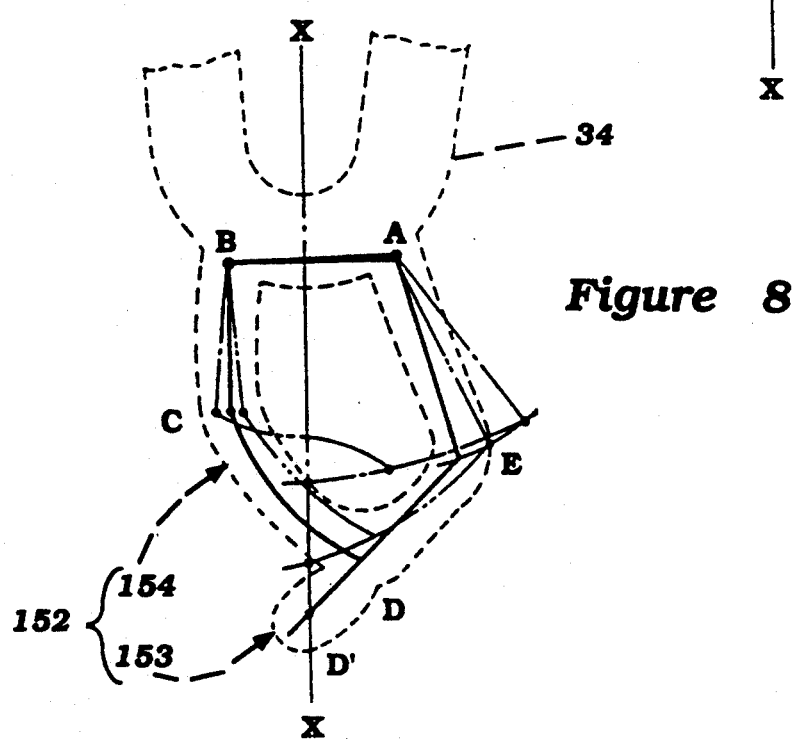
FIG. 8 is a diagramatic view showing how the seal of the embodiment of FIG. 7 is deflected so as to minimize abrasion.

Because of the construction of the previously described embodiments wherein the sealing is achieved by bending rather than compression, there is some possibility of abrasion due to the movement that occurs during sealing. It has been described that this abrasion can be substantially eliminated through the use of a anti-friction member such as the teflon strips 51 in the embodiments of FIGS. 4, 5 and 6. FIGS. 7 and 8 show another steel construction which is generally similar but wherein the seal is designed so that the bending motion causes the seal surface to move in a straight line relative to the engaged surface of the tray and the possibilities of such abrasion will be avoided without the necessity for the anti-friction material. Since, for the most part, the construction of this embodiment is similar to the previously described embodiments those components which are the same or substantially the same have been identified by the same reference numerals. It should be noted that the seal mounting portion or base portion 34 in this embodiment is reinforced by an imbedded, rigidifying member 151 that will cause the ribs 36 to have a greater holding force. The construction of the seal part 41 is the same as in the previously described embodiment and, for that reason, it has been identified by the same reference numeral and further description of it is believed to be unnecessary.

In this embodiment, however, the first seal part, indicated generally by the reference numeral 152 is comprised of a lip type sealing portion 153 that is connected to the base portion 34 by an intermediate portion 154. As may be best seen in FIG. 8, the base portion 154 is not tubular in configuration but rather is configured as a linkage system having pivot joints A, B, C and E. These pivot joints are constructed so that when the seal deflects as shown in these two figures, the sealing surface of the portion 153 moves directly along the line x—x and, as a result, its point of engagement D will always stay in the same line and there will be no transverse movement as might cause abrasion.

It should be readily apparent from the foregoing descriptions that a number of embodiments of the invention have been illustrated and described and each of which is highly effective in providing a very good seal without the necessity for high sealing forces since the seal is achieved by bending rather than compression. Although a number of embodiments of the invention have been illustrated and described, various changes and modifications may be made without departing from the spirit and scope of the invention as defined by the appended claims.

We claim:

1. A seal arrangement for interposition between a pair of spaced apart sealing surfaces of tray and cowling of a powerhead of an outboard motor for facilitating sealing without the necessity of compressing the seal, said seal comprising a base portion for affixing said seal to one of said tray and said cowling, a pair of portions each for sealingly engaging a respective one of the sealing surfaces of the other of said cowling and said tray when said cowling and said tray are affixed to each other, a pair of intermediate portions each integrally connecting said base portion with a respective one of said seal portion, said intermediate portions being deflected by bending upon assembly of said cover to said tray for sealing engagement of said seal portion without the necessity of compression of said seal and at least one of said intermediate portions comprising a hollow tubular section and its seal portion comprising a lip type seal having a base integrally formed with said tubular section and offset to one side thereof, said lip type seal having a substantially uniform width and extending across said tubular section toward the other side thereof for further effecting the sealing engagement without compression of said seal by cantilevered bending of said lip type seal and bending of said tubular section.

2. A seal arrangement as set forth in claim 1 wherein the other intermediate portion is linear and deflects by bending of said intermediate portion.

3. A seal arrangement as set forth in claim 1 wherein at least one of the intermediate portions is a linear portion disposed outwardly of the periphery of the one of the tray and cowling for facilitating bending of said intermediate portion.

* * * * *